United States Patent [19]

Schraufstetter et al.

[11] Patent Number: 5,376,156
[45] Date of Patent: Dec. 27, 1994

[54] METHOD FOR BINDING PARTICULATE WASTES SUCH AS DUSTS, FIBERS, PAPER AND METAL WASTES OR THE LIKE, INTO SOLIDS

[76] Inventors: Wilfried Schraufstetter, Schlosstrasse 5, W-8045 Isamaning, Germany; Dieter Gastinger, Schwojerstrasse 17, W-800 München 60, Germany

[21] Appl. No.: 116,814

[22] Filed: Sep. 7, 1993

Related U.S. Application Data

[63] Continuation of Ser. No. 721,589, Jul. 22, 1991, abandoned.

[51] Int. Cl.5 .......................... C10L 5/06; B29C 47/38
[52] U.S. Cl. ..................................... 44/593; 588/255; 44/596; 264/211.21
[58] Field of Search ................ 44/593, 596; 588/255; 264/211.21

[56] References Cited

U.S. PATENT DOCUMENTS 4,772,430  9/1988  Sauda et al. ................ 588/255

FOREIGN PATENT DOCUMENTS 0262083  3/1988  European Pat. Off. .
0288150  10/1988  European Pat. Off. .
0023530  5/1982  Japan .
1434406  5/1976  United Kingdom .

*Primary Examiner*—Jerry D. Johnson
*Attorney, Agent, or Firm*—Bacon & Thomas

[57] ABSTRACT

The particulate waste is mixed with plastic waste in a screw extruder, pressed and extruded. The particulate waste and plastic waste are introduced into the feed hopper of a screw extruder. The components introduced are intimately mixed in the screw extruder by the rotating screw(s) and firmly compressed. The pressure in the mixture may be up to 100 bar. The particulate waste is bound in the plastic in a way that prevents any further contact with the environment.

15 Claims, No Drawings

METHOD FOR BINDING PARTICULATE WASTES SUCH AS DUSTS, FIBERS, PAPER AND METAL WASTES OR THE LIKE, INTO SOLIDS

This application is a continuation of application Ser. No. 07/721,589, filed Jul. 22, 1991 now abandoned.

DESCRIPTION

The invention concerns a method for binding particulate wastes such as dusts, fibers, paper and metal wastes or the like, into solids.

Particulate wastes such as filter dusts, which presently are collected in large quantities especially, for instance, when purifying smoke-stack gases, are bound, for example, using cement and water.

The use of cement, however, which must be acquired as a separate, extensive ingredient, makes the product more expensive. Furthermore, the product so made furthermore evinces only slight mechanical strength and its applicability is accordingly restricted.

It is known furthermore to utilize particulate wastes from smoke-stack purification equipment in the making and processing of gypsum.

Metal dusts, for instance from grinding, hardly lend themselves to being reprocessed. In particular, on account of their small particle sizes, metal dusts cannot be further smelted. This is also the case for other metal wastes such as small chips.

Fibers, for instance from asbestos and in the form of wastes, can be transported only using stringent safety measures and can be reprocessed only in part.

Paper wastes such as from confidential documents, paper money withdrawn from circulation, cheque forms, securities or the like as a rule should be made unusable without having to transport them. Such wastes were generally burned in earlier days, but today such disposal frequently meets with ecological constraints. Moreover this procedure generates toxic gases on account of the special printer inks.

The German patent documents A 2,402,976; 2,444,420 and 2,539,195 disclose a method for processing plastic, and in part thermoplastic, wastes into a new material.

These plastic wastes are mixed with more than 50% by weight of fillers in a mixer at raised temperatures. These fillers may be wood wastes, asbestos, peat, sulfur, silica, sand, graphite, metal chips, incinerator ash, wastes from heat-setting plastics and the like. The plastic is present in comminuted, particulate form so it can be mixed with the fillers in the mixer. When being mixed with the other parts, the plastic is converted into the soft or liquid state by heating and the components are mixed and subjected to pressure.

For such purposes, the fillers, which may be coated, are introduced together with the plastic wastes in a mixer where the temperature is raised up to 400° C. depending on the plastic and from which the mixture is discharged as a quasi-homogeneous paste. Following cooling, this paste furthermore may be subjected to another processing step such as extrusion, spray-injection molding or granulation, calendering, pressing, or extrusion molding. The material also may be transformed in such latter processing step if it still evinces a pasty consistency at raised temperatures. The transformation or reshaping may take place at low pressures. For example, the pasty material may be forced through a gauging nozzle and be extruded into a strand or a plate.

To prevent the wood chips from retaining moisture in this procedure, the coating of the wood chips takes place in a vacuum; that is, the chips are pre-dried before coming into contact with the plastic wastes. A gaseous atmosphere also may be employed for other fillers.

The material can be formed at low pressures from a few $kg/cm^2$ to 30 $kg/cm^2$ by compression or by injection-molding.

Depending on the initial substances, the material evinces a density of 0.8 kg/ltr to 2.5 kg/ltr.

Commercial kneader mixers or an agitator with a heated housing may be used as mixers for this known procedure.

Again this known procedure for reprocessing plastic wastes is expensive both as regards equipment and energy, i.e., it is not particularly economical.

The European patent document A 0,262,083 discloses making a solid fuel from industrial production residues, possibly pre-comminuted, which are mixed together and pressed into a body of desired shape, said fuel consisting of cellulosic materials, in particular wood and/or paper, and of polyethylene. The moisture present in the mixture is evaporated during pressing and evacuated as vapor.

Any metallic parts in the mixture are removed from it before it is introduced in the screw extruder.

This fuel evinces high caloric value and for reasons of shipping, high density. It is environment-friendly and universally applicable and can be unrestrictedly stored even under changing weathering conditions.

However the energy consumption required by pressing in the screw extruder and by the very high compression up to a maximum of 1766 bars demanded by this procedure is very high.

The object of the invention is to create a method whereby particulate wastes such as dusts, fibers, paper and metal wastes or the like can be bound in more economical manner and whereby an improved product can be made, especially one which can be processed further.

This problem is solved by the method of the invention. In the method of the invention for binding particulate wastes such as dusts, fibers, metal and paper wastes or the like into solids, the particulate wastes together with plastic wastes are mixed in a screw extruder, pressed and extruded, air being introduced into the mixture of particulate wastes and plastic wastes and the mixture being kneaded in the screw extruder until essentially all the air has been removed.

The expression "plastic wastes" as a rule denotes organic carbonaceous liquids or solids. Solid plastic wastes of any kind, but also lacquer, varnish or enamel slurries or other adhesive, especially organic slurries are also included.

The particulate wastes, dusts, fibers, paper and metal wastes or the like and the plastic wastes such as organic carbonaceous liquids or solids or the like are fed into the hopper of a screw extruder. The fed-in components are thoroughly mixed in the screw extruder by the revolving screw(s) and in the process are strongly compressed. The pressure in the mixture may be as high as 100 bars.

When kneading takes place in the screw extruder, the air is forced out of the mixture of solids, thereby generating the heat required to melt the plastic wastes.

By controlling the quantity of added air, the temperature in the screw extruder in turn may be controlled in a simple manner in relation to the particular plastics used.

The mixture is kneaded in the screw extruder until essentially all the air, that is, the air present in the particulate wastes, that added further and that having arrived during filling the screw extruder, has been removed.

Furthermore liquids, especially concentrated waste liquids, may be admixed to the mixture in the screw extruder.

Illustratively noxious liquids may be fed into the screw extruder. On account of the great heat in the screw extruder, the liquid, in particular water, evaporates. Especially when it is noxious, the evaporating liquid also may be collected when leaving the screw extruder and be condensed. The solid components then shall be kneaded into the mixture.

Illustratively, 100 liters of liquid per ton of solid mixture of particulate wastes and plastic wastes may be introduced.

In one embodiment, the particulate wastes used are filter dusts from smokestack purifying equipment. These dusts are so bound into the plastic that they no longer are in contact with the environment. Attention should be paid to making the plastic corrosion-resistant.

Because of the high pressure in the screw extruder and the ensuing homogenization of the mixture, it suffices that the proportion by weight of the plastic wastes in the mixture of solid be up to 30%, preferably 15%.

Because no pre-mixer precedes the screw extruder, the plastic wastes preferably shall be supplied in granular form to the mixture. The granulate may evince a diameter from 10 mm to 40 mm. For example, foil wastes may evince 2 mm×2 mm surfaces. In this way, the material leaving the screw extruder will be uniformly mixed.

The product leaving the screw extruder may be in the form of bars or pellets and is compressible up to 400 kg/cm$^2$; it may evince a density up to 1.8 kg/ltr and higher depending on the material used. The pellets or bars may evince a cross-section up to 60×60 mm$^2$.

These pellets or bars furthermore may be stored as such. Moreover, they can be combined into bigger blocks and be injection-molded with plastic. In that form, they may be applicable as building materials.

These pellets and bars also can be smelted especially when they also contain metal particles. Because the high temperatures which are involved in smelting equipment, the non-metallic materials will be burned off. The heat so generated can be used for smelting.

The design of the screw extruder illustratively may be that described in the patent documents WO A 83/03,999; DE A 3,714,508; DE A 3,714,509 and DE A 3,714,518. This is a screw extruder with two parallel screws.

Illustratively, the particulate wastes are fed from a supply receptacle to a conveyor belt on which they are weighed. Depending on the weight of these wastes and the proportioning, the plastic wastes are metered onto the conveyor belt. Both kinds of wastes are fed jointly to the hopper of the screw extruder.

If liquids are further added, then they shall be introduced separately and in metered quantities into the screw extruder.

We claim:

1. A method for binding particulate wastes into solids, wherein the particulate wastes are mixed and kneaded with plastic wastes in a screw extruder and then are extruded, wherein air is introduced into the screw extruder to increase the amount of air in the screw extruder above that which is present in the particulate wastes and that having arrived during filling the screw extruder, air being admixed to the mixture of particulate wastes and plastic wastes and the mixture being kneaded in the screw extruder until essentially all the air has been removed, and wherein heat is generated by the process of kneading the admixed air through the mixture, the heat causing melting of the plastic wastes.

2. The method defined in claim 1, characterized in that the pressure in the mixture is up to 100 bars.

3. The method defined in claim 1, characterized in that liquids are admixed to the mixture.

4. The method defined in claim 3 wherein said liquids are concentrated waste liquids.

5. The method defined in claim 3 wherein said liquids are noxious liquids.

6. The method defined in claim 3, further comprising the steps of (a) collecting the liquids are leaving the extruder and (b) separating the liquids from the mixture.

7. The method defined in claim 1 wherein said particulate wastes are selected from the group consisting of filter dusts from smoke-stack purifying equipment, metal dusts, metal chips, asbestos fibers and paper documents.

8. The method defined in claim 1, characterized in that the proportion of weight of the plastic wastes in the solid mixture is up to 30%.

9. The method defined in claim 8 wherein said proportion of weight of the plastic wastes in the mixture is 15%.

10. The method defined in claim 1, characterized in that the plastic wastes are added in the form of granulates to the mixture.

11. The method defined in claim 1, characterized in that the mixture leaves the screw extruder in the form of pellets or bars.

12. The method defined in claim 11, further comprising the step combining the pellets or bars into larger blocks.

13. The method defined in claim 11, further comprising the step of smelting the pellets and bars.

14. The method defined in claim 1 wherein said plastic wastes are selected from the group consisting of lacquers, varnishes, enamels and adhesives.

15. The method defined in claim 1 wherein said particulate wastes are characterized by having a diameter of 10 mm to 40 mm.

* * * * *